(12) United States Patent
Mesina

(10) Patent No.: US 6,924,742 B2
(45) Date of Patent: Aug. 2, 2005

(54) BABY SEAT BELT ALARM SYSTEM

(76) Inventor: Fred Mesina, 2658 Spring St., Unit C, Redwood City, CA (US) 94063

( * ) Notice: Subject to any disclaimer, the term of this patent is extended or adjusted under 35 U.S.C. 154(b) by 73 days.

(21) Appl. No.: 10/374,314

(22) Filed: Feb. 25, 2003

(65) Prior Publication Data

US 2004/0164856 A1 Aug. 26, 2004

(51) Int. Cl.$^7$ ............................................... G08B 23/00
(52) U.S. Cl. ................................. 340/573.1; 340/457.1; 340/539.11
(58) Field of Search ............................... 340/573.1, 457, 340/457.1, 539.11, 686.1, 687; 180/286; 280/731, 801.1; 307/10.1

(56) References Cited

U.S. PATENT DOCUMENTS

| | | | |
|---|---|---|---|
| 3,836,955 A | 9/1974 | Cracraft et al. ............. 180/270 |
| 5,316,868 A | 5/1994 | Dougherty et al. ............. 429/9 |
| 5,454,591 A | 10/1995 | Mazur et al. ............... 280/735 |
| 5,482,314 A | 1/1996 | Corrado et al. ............. 280/735 |
| 5,581,234 A | 12/1996 | Emery et al. ............ 340/457.1 |
| 5,627,512 A | 5/1997 | Bogar ...................... 340/457.1 |
| 5,652,569 A | 7/1997 | Gerstenberger et al. . 340/573.4 |
| 5,783,871 A | 7/1998 | LeMense .................. 307/10.1 |
| 5,793,291 A | * 8/1998 | Thornton ................. 340/573.1 |
| 5,949,340 A | * 9/1999 | Rossi ....................... 340/573.1 |
| 6,102,440 A | 8/2000 | Bergkessel ................. 280/808 |
| 6,104,293 A | 8/2000 | Rossi ....................... 340/573.1 |
| 6,127,921 A | * 10/2000 | Gullner et al. ......... 340/426.26 |
| 6,357,091 B1 | 3/2002 | Devereaux ..................... 24/633 |
| 6,390,529 B1 | 5/2002 | Bingle et al. .................. 296/76 |
| 6,445,988 B1 | 9/2002 | Breed et al. ................... 701/45 |
| 6,489,889 B1 | * 12/2002 | Smith .......................... 340/457 |
| 6,498,562 B2 | 12/2002 | Yano ....................... 340/457.1 |
| 6,535,137 B1 | * 3/2003 | Ryan .......................... 340/687 |
| 6,714,132 B2 | * 3/2004 | Edwards et al. ......... 340/573.1 |
| 2003/0098792 A1 | * 5/2003 | Edwards et al. ......... 340/573.1 |
| 2003/0122662 A1 | * 7/2003 | Quinonez ................... 340/457 |

OTHER PUBLICATIONS

Beyond 2000 (2002). "Hot–Wired Child," *Engineering–Safety & Security* located at: <http://www.beyond2000.com/news/Feb_02/story_1328.html> last visited on Dec. 30, 2002, three pages.

Braukas, M. et al. (2002). "NASA Develops Child Car–Seat Safety Device," *NASA NewsRelease No. 02–008* located at: <http://www.larc.gov/news_and_events/inside_pages/2002/02–008.html> last visited on Dec. 30, 2002, three pages.

Godoy, M. (2002). "Smart Seat Protects Kids," *Tech Live* located at: <http://www.techtv.com/news/print/0,23102,3371915,00.html> last visited on Dec. 30, 2002, two pages.

* cited by examiner

*Primary Examiner*—Toan N. Pham
(74) *Attorney, Agent, or Firm*—Morrison & Foerster LLP

(57) ABSTRACT

A seat belt alarm system activates an alarm when a child is buckled in a car seat and when the car key is removed from the ignition. The seat belt alarm system includes a belt buckle having a belt-buckled sensor and a transmitter that transmits a belt-buckled signal when the belt is buckled. A remote key module includes a key-removed sensor that senses when the key is not in a keyhole. The key module further includes a receiver and an alarm device that is activated when the key is not in the keyhole and the belt-buckled signal is received from the transmitter. In another variation, a controller is provided. The controller may be coupled to various components including the belt-buckled sensor, a key-removed sensor, a transmitter and additional devices such as a horn, air conditioning, etc. The controller instructs the transmitter to send an activate-alarm signal to a receiver in the key module when a belt-buckled signal and a key-removed signal are input to the controller. The alarm device may provide a sound, vibration, light, or another indicator. Another variation includes a removable baby seat with a seat belt alarm system. Still another variation includes an automobile having a seat belt alarm system.

23 Claims, 5 Drawing Sheets

BABY SEAT BELT ALARM SYSTEM

FIELD OF THE INVENTION

This relates to seat belt alarm systems and in particular to seat belt alarm systems that activate an alarm when a child is left in a vehicle.

BACKGROUND OF THE INVENTION

Each year a number of children die because they are left in vehicles for a prolonged period of time. These tragic incidents typically arise when a driver reaches her destination and leaves the car to run a quick errand, forgetting the child is in the car. Infants are particularly susceptible to dehydration and may relatively quickly slip into a comatose state or even worse, suffer a deadly heat stroke.

A number of car-seat safety devices have been developed to address the above identified problem. One system for preventing children from becoming inadvertently locked within a vehicle is described in U.S. Pat. No. 5,793,291. The '291 patent describes activating an alarm when motion is detected and the temperature is above a threshold level. The system utilizes a motion detector to detect the presence of a child or pet within a vehicle. Although this system provides some advantages, particularly in the case of older children that may inadvertently lock themselves in a vehicle while playing and may be actively seeking escape, it fails to protect infants who have been left asleep in their child seats and are not capable of sufficient activity to set off a motion detector. Infants, for example, may become dehydrated during sleep and may drift into a comatose state without ever waking or moving.

Another patent, U.S. Pat. No. 6,104,293, describes an apparatus for warning when a child has been left in an infant seat and the vehicle has been turned off. The apparatus includes an occupant detection mechanism for detecting the presence of an occupant in an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm unit for generating an alarm in response to the alarm signal. See also U.S. Pat. No. 5,949,340.

U.S. Pat. No. 6,489,889 describes a system that activates an indicator when the seat belt is buckled and the ignition is turned off. The system includes a controller that controls the indicator in response to the seat belt buckled signal and the ignition-off signal. Various types of indicators are described including remote keyless devices as well as cellular networks.

NASA has also developed a child presence sensor driver alarm. As described, a driver alarm, designed to hang on the driver's key ring, sounds ten warning beeps if the driver moves too far away from the vehicle. If the driver doesn't return within one minute, the alarm will beep continuously and cannot be turned off until it is reset by returning to the child safety seat. The sensor switch triggers immediately when a child is placed in the seat and deactivates when the child is removed. The sensor detects weight once the child is placed in the seat, transmitting a unique code to the driver-alarm module via a radio-frequency link. If the driver moves too far from the vehicle, the alarm sounds. See NASA News Release No. 02-008, Langley Research Center (Feb. 5, 2002).

The above described systems, however, tend to be overly complicated. A simpler and more elegant solution is still desirable. None of the above described systems alert a driver that her child is left in the car as taught herein.

BRIEF SUMMARY OF THE INVENTION

A seat belt alarm system comprises a seat belt buckle with a sensor therein. The sensor detects whether the belt is buckled. A transmitter is coupled to the seat belt-buckled sensor and the transmitter is configured to transmit a belt-buckled signal when the belt is buckled.

The seat belt alarm system also includes a remote key module. The key module comprises a receiver for receiving the belt-buckled signal. The key module also includes a voltage source, an alarm device, and a key-removed switch. The key-removed switch is coupled to the receiver, voltage source, and alarm device such that when the key is not in a keyhole and the belt-buckled signal is received by the receiver, the alarm device is activated. The alarm device may sound, vibrate, light, or otherwise alert the driver.

The design of the key-removed switch may vary widely. In one embodiment it is a mechanical switch. The mechanical switch may comprise a mechanically biased rod member that is displaced when the key is inserted into the keyhole. The rod member may be held in an assumed position by a spring or other resilient member. Also, the key-removed switch may be an electronic switch that detects when the key is not in a keyhole. The key-removed switch may detect light, magnetic flux, electricity, pressure, and/or another parameter and if the measured signal is greater than a threshold value, the sensor sends an output signal or switches the circuit to provide an output signal. In this manner, a key-removed switch or sensor can provide a key-removed signal when the key is not in the keyhole.

The belt-buckled sensor may be an electronic sensor or switch that is turned ON or generates a signal when the buckle is closed. The belt buckle may include other components such as at least one indicator light that indicates when the seat belt buckle is locked. The buckle may also include a passageway for receiving a tongue-shaped belt member. A controller may be coupled to the seat belt buckle sensor, activating the transmitter when the belt is buckled.

Another embodiment of the invention is an automobile that comprises a seat; a seat belt buckle having a seat-belt sensor therein, a key-removed sensor; a transmitter for sending an alarm-activate signal to a remote device; and a controller coupled to the seat-belt sensor, the key-removed sensor, and the transmitter. The controller is configured to activate the transmitter in response to the key-removed signal and a belt-buckled signal.

A number of other devices may be coupled to the controller such as a horn, lights, windows, air conditioning or heating systems, etc. The controller may be programmed or configured to activate any coupled device in response to various inputs such as the key-removed signal and the belt-buckled signal.

Also, the controller may be coupled to additional sensors to receive input relating to temperature, pressure, motion, proximity, humidity, weight, ignition state, etc. These inputs may be interrogated according to a controller algorithm. For instance, if an input value exceeds a threshold value, the alarm device may be activated; the windows may be rolled down; and/or the temperature may be adjusted, etc.

The transmitter may also be configured to send the alarm-activate signal to a pager, cell phone, portable module, or a key module carried with the driver.

Another embodiment is an infant car seat system comprising, amongst other things, an infant car seat. The infant car seat is adapted to be removably secured in a passenger car seat. An infant seat belt is connected to the infant car seat to hold the infant in the infant car seat. The infant seat belt includes a seat belt-buckled sensor and a transmitter coupled to the seat belt-buckled sensor. The transmitter generates a belt-buckled signal when the seat belt is buckled. Also, a remote key module comprises a key-removed sensor that senses when the key is not in a keyhole. The key module also includes a receiver for receiving the belt-buckled signal from the transmitter and an alarm device. The alarm device is coupled to the key-removed sensor and receiver such that the alarm device is activated in response to the belt-buckled signal and the key-removed signal.

The infant car seat may be directly attachable to the passenger seat. It may also be attached to an infant seat base that is secured to the passenger seat. An infant seat base allows the infant car seat to be quickly secured and removed from the vehicle.

Additionally, the belt-buckled sensor of the infant car seat may be an electronic switch that completes a circuit when the belt is buckled. Also, the sensor may include a detecting component that detects a parameter and provides an output based on the parameter detected. Examples of parameters include optical, magnetic flux, pressure, electrical, or another parameter that may be detected when a belt buckle is closed.

Another car seat belt alarm system comprises a child presence sensor and a transmitter coupled to the child presence sensor such that when a child is present in the car seat a child-present signal is transmitted from the transmitter. The system further includes a key module. The key module is remote to the child presence sensor. The key module comprises a receiver for receiving the child-present signal, a voltage source, an alarm device, and a key-removed sensor. The key-removed sensor is coupled to the receiver, voltage source, and alarm device such that when the key is not in a keyhole and the child-present signal is received by the receiver, the alarm device is activated. Various types of sensors may be used as the child presence sensor including a load cell, pressure sensor, optical sensor, a belt-buckled sensor, or another type of sensor.

A method for detecting the presence of an occupant in a vehicle comprises sensing whether a seat belt is buckled; sensing whether a key is in the ignition; and activating an alarm in response to the sensing steps.

Components of the seat belt alarm system may be located within the seat belt buckle, within the seat or infant seat, within the vehicle or combined with the infant seat and the vehicle. The key module is preferably connected or integral with an ignition key. The key module is intended to be carried with the driver when she leaves the car.

BRIEF DESCRIPTION OF THE SEVERAL VIEWS OF THE DRAWING(S)

The following detailed description describes a number of embodiments of the present invention. It is intended that aspects of the embodiments and the embodiments themselves may be combined except where the components are mutually exclusive.

DETAILED DESCRIPTION OF THE INVENTION

The seat belt alarm system described here generally serves to prevent a driver from inadvertently leaving her baby in the car. In particular, an alarm device is activated when the car key is removed from the ignition and the baby is still buckled in the car seat. The alarm is deactivated when the baby is unbuckled from the car seat or when the car key is in the ignition keyhole.

Figure 1:
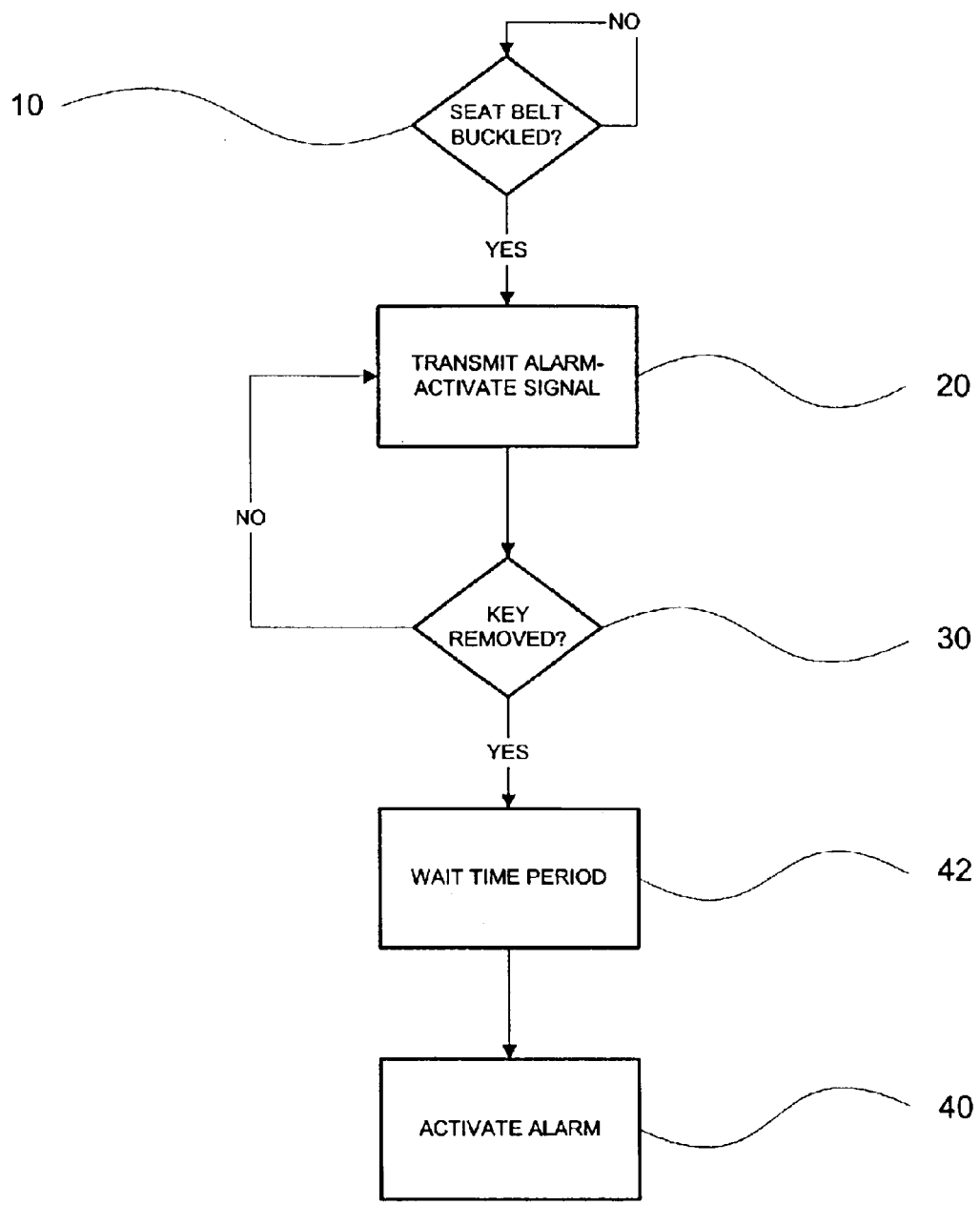
FIG. 1 is a flow chart showing the steps to activate an alarm when a child is left in a vehicle.

FIG. 1 is a flow chart illustrating a system suitable for alerting a driver leaving the car that her child is still in the car. The system first determines whether the seat belt is buckled (step 10). The seat belt should be buckled whenever the child is seated in the car. Once the seat belt buckle is properly locked, a coded signal is transmitted from the car to a key module carried with the driver. This step is indicated by reference numeral 20.

Next, as indicated by reference numeral 30, the system detects whether the key is removed from the keyhole. For example, a driver will typically remove the key from the ignition after she parks the car to run an errand. When this situation occurs, the key module activates the alarm alerting the driver that the baby is still buckled in the car seat (step 40). If desired, a timer or waiting period 42 may be included to delay activation of the alarm until a period of time has elapsed. This provides the driver some time to unbuckle and remove the child before the alarm activates.

Unbuckling the seat belt stops the coded signal from being transmitted to the key module, preventing the alarm from sounding or otherwise alerting the driver that the baby is still locked in the seat. Using this system, a driver is less likely to leave her child in the car as she runs an errand because an alarm will be activated if her key is removed from the ignition and the child is buckled in the seat.

Figure 2A:
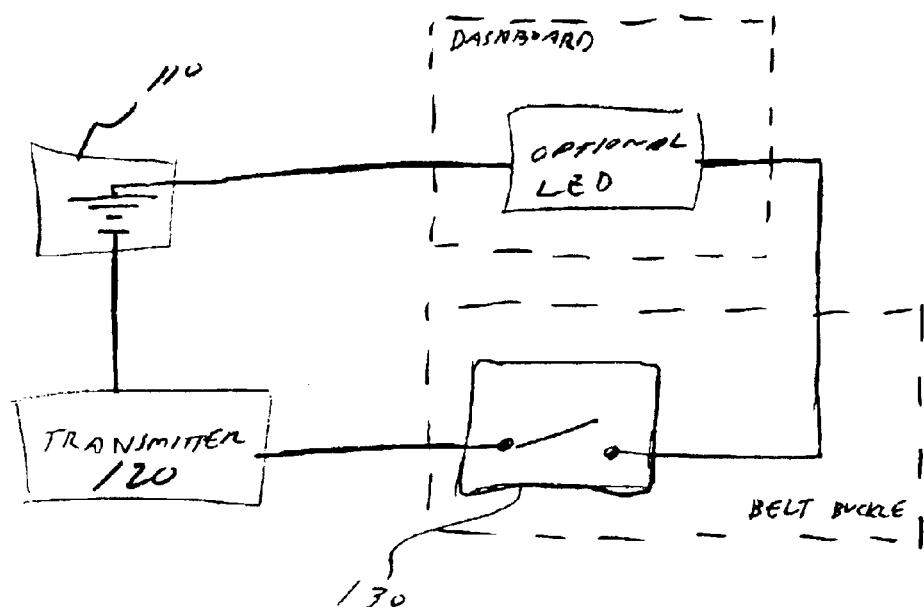
FIG. 2A is a circuit diagram of the belt buckle components.

A circuit diagram a belt buckle is shown in FIG. 2A. The belt buckle in the vehicle typically includes three components: a power source 110, a transmitter 120, and a sensor or switch 130. An alarm such as a dashboard LED may also be connected to this circuit to alert the driver as to whether the seat belt is buckled.

The power source 110 may be a battery, alternator, generator, or another power source.

The transmitter (120) may be a wireless transmitter and is connected to the battery. Depending on whether the buckle switch is ON, a coded signal is transmitted to the key module. The coded or belt-buckled signal instructs the key module to activate the alarm. A variety of wireless transmitters such as an RF-transmitter may be used to transmit the signal to the key module. Such transmitters are known to those of ordinary skill in the art. See, for example, U.S. Pat. No. 5,652,569 describing an RF transmitter/receiver system for sensing when a child wanders out of range. Other examples of RF receiver/transmitter kits may be provided by a number of companies such as, for example, RF Micro Devices Corporate Headquarters and GaAs HBT Fabrication Facilities, 7628 Thorndike Road, Greensboro, N.C. 27409-9421.

The circuit diagram shown in FIG. 2A additionally includes a buckle sensor or switch 130. Buckle switch 130 is configured to sense when the seat belt is properly buckled or locked. Once the buckle is properly locked, transmitter 120 will transmit the coded signal to the corresponding receiver located in the key module.

Buckle switch 130 may have various designs. A buckle switch may be configured such that when the seat belt system is locked, the switch closes, turning the circuit ON and transmitting the coded signal to the corresponding receiver.

Figure 2B:
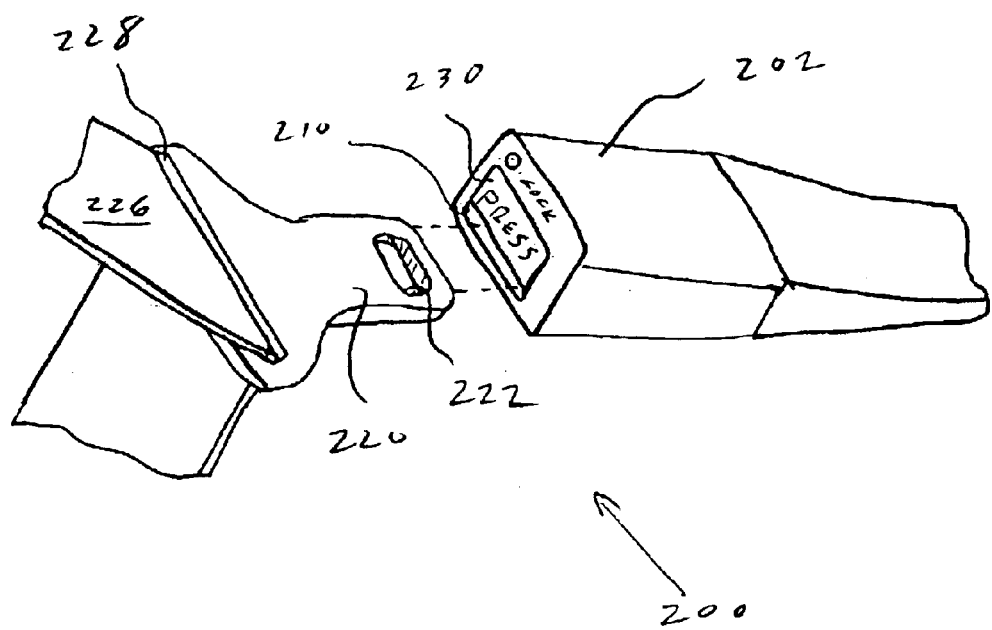
FIG. 2B is an illustration of a belt buckle and tongue-shaped member being inserted in a passage of that belt buckle.

One embodiment of a seat belt system 200 is shown in FIG. 2B. The system 200 includes a buckle 202 containing a passage 210 for receiving a tongue-shaped seat belt member 220. A strap 226 is threaded through a slot 228 in the tongue member 220. The tongue member 220 may be inserted into the passage of the buckle. The tongue also may include a hole 222 that interlocks with a spring-loaded locking member (not shown) in the buckle. When the tongue is properly inserted into the buckle 202, the spring-loaded locking member penetrates the hole 222 and locks the seat belt. The tongue member may not be removed unless the locking member is released by pressing button 230.

The locking member may be coupled to a switch such that when the locking member is displaced, the switch is opened or closed. See also, U.S. Pat. App. Pub. No. 2001/0002816 to Yano (describing a seat belt buckle detector that senses whether the seat belt is buckled even if the ignition is turned off).

A sensor may be incorporated into the buckle to sense when the buckle has been properly locked. Various types of sensors may be incorporated into the buckle or tongue including optical, magnetic, electrical, etc. U.S. Pat. No. 6,357,091 to Devereaux, for example, describes a latch sensing seat belt buckle that uses magnetic flux. The described buckle includes a sensor and a magnet. The magnet is movable from a first position to a second position when a lockable element is inserted into the passage of the buckle. The magnet creates a magnetic field of a first flux density acting on the sensor to cause the sensor to provide a first output when the magnet is in the first position. The magnet creates a magnetic field of a second flux density, different than the first flux density, acting on the sensor to cause the sensor to provide a second output, different than the first output, when the magnet is in the second position.

A controller may also be coupled to the sensor. Once the controller receives a signal from the sensor indicative that the buckle is properly locked, the controller activates the transmitter. Incorporating a controller into the circuit may provide for control of additional devices as will be described further below.

Additionally, a locked seatbelt may be indicated by a light on the buckle, the dashboard, or elsewhere. LEDs are examples of light sources. However, other light sources (e.g., incandescent light) and other types of indicators (e.g., speaker) may be used. Again, these indicators can be used to indicate when the seat belt has been locked properly.

Figure 3:
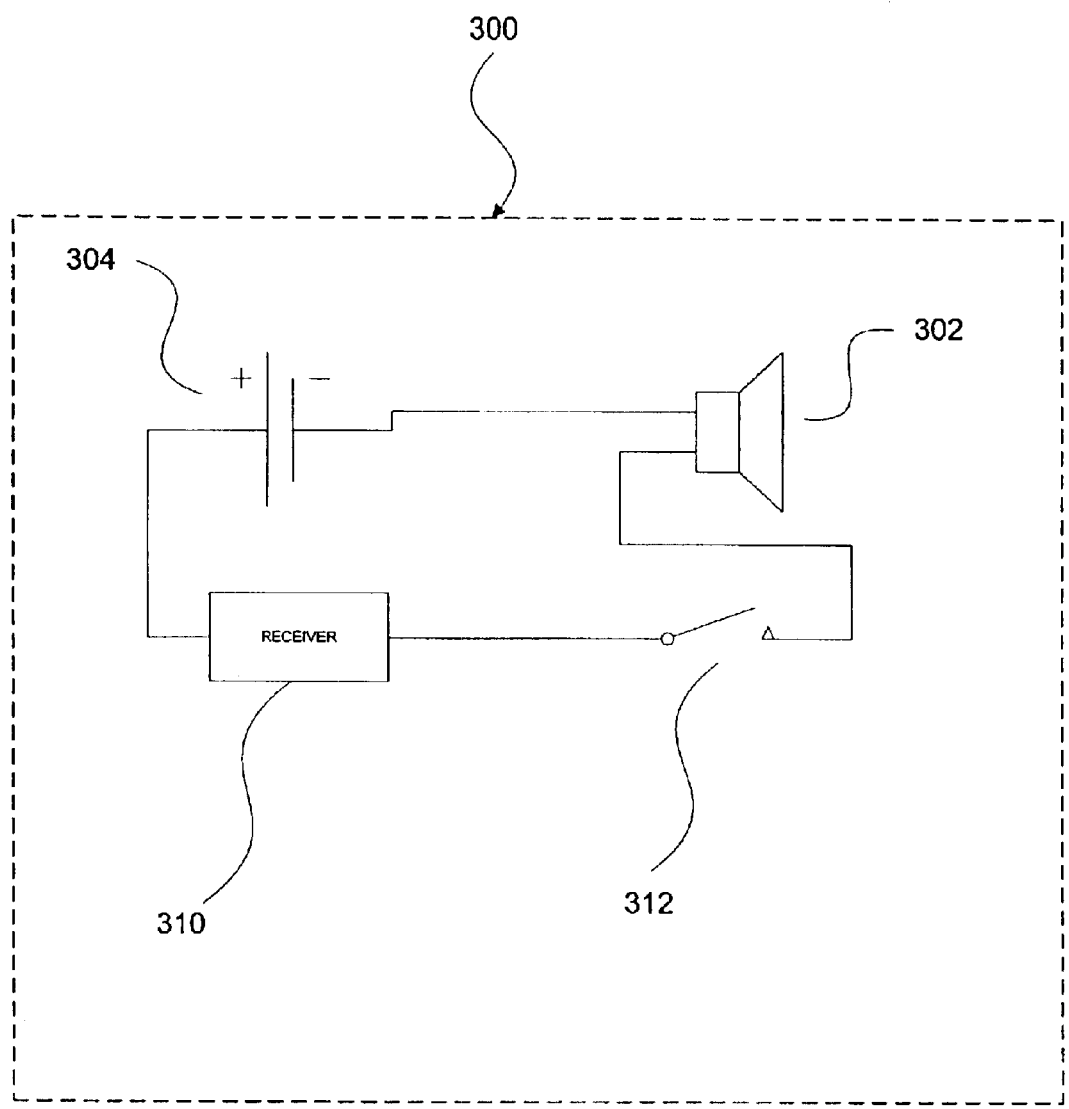
FIG. 3 is a circuit diagram of a key module.

FIG. 3 shows a circuit diagram for a key module 300. As indicated above, the key module 300 activates the alarm when (1.) the seat belt is locked and (2.) the key is not in the ignition. Referring to FIG. 3, the key module includes a circuit having an alarm 302, a battery 304, a receiver 310, and a key-removed sensor or switch 312.

The receiver 310 receives the belt-buckled signal transmitted from the transmitter in the vehicle. In one variation of the invention, when the receiver senses the belt-buckled signal, a switch is closed, allowing current to reach other elements of the circuit.

Additionally, the receiver may be configured to receive the signal and send an output signal to a key module controller (not shown). The controller may be programmed to select a particular output signal based on the information it receives from the receiver. For example, the controller may be programmed to activate the alarm if an activation-alarm signal is received from the transmitter and if, as discussed further below, a sensor detects that the key is removed from the ignition. Still other input signals may be fed to the controller and it may be programmed to provide output signals based on the input signals.

The key-removed switch 312 is designed such that when the key is removed from the keyhole, the key-removed switch closes, allowing current to pass on to other parts of the circuit. In particular, the alarm 302 may be activated when both the receiver detects the belt-buckled signal and the key-removed switch is closed.

Also, a key-removed sensor may be incorporated into the key module. The key-removed sensor may be configured to detect when the key is not in the ignition or keyhole and provide a key-removed signal. The key-removed sensor may be coupled to a controller. The controller can then activate the alarm in response to the belt-buckled signal and the key-removed signal. Also, it should be understood that the key-removed sensor may be incorporated into the key module or the car. Many of the components described here may be incorporated into the car or the remote key module.

Figures 4A, 4B, 4C:
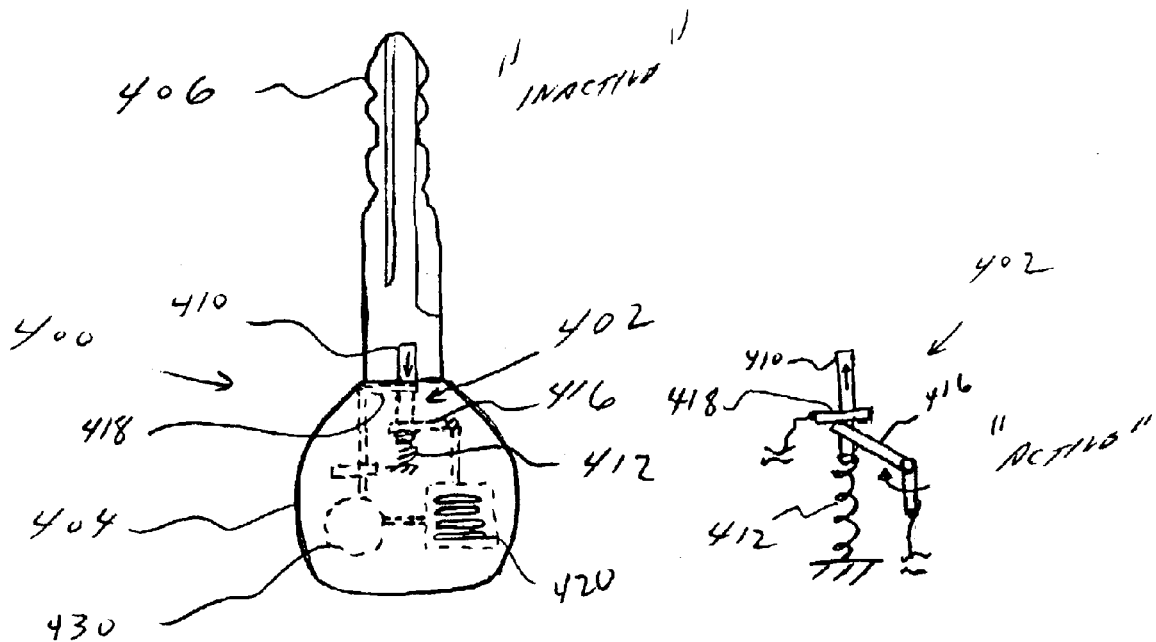
FIG. 4A is a front view of a key module having an alarm device in a deactivated state.
FIG. 4B is a partial view of the key module of FIG. 4A in an activated state.
FIG. 4C is a side view of the key module shown in FIG. 4A.

Shown in FIGS. 4A and 4B is a key module 400 having a key-removed switch 402 in an inactive and active state respectively. The module is enclosed or encapsulated in a shell 404 that is attached (or part of) a key 406. The key may be, for example, an ignition key.

The key-removed switch may include a number of components such as a rod member 410 and, perhaps, a spring 412 that urges the rod member in a first position. Also, the rod itself may be designed such that it is a resilient deflectable member and assumes a first position, rendering the spring unnecessary.

Referring to FIG. 4A, an inactive state is shown. When the key-removed switch is in this inactive state, a current may not pass through the circuit.

The switch is made inactive when rod member 410 is depressed. Rod member may be depressed by, for example, inserting the key in the ignition. The key 406 fits into the keyhole but the rod member 410 is stopped at an edge of the keyhole. The rod member 410 is designed and attached to the key 406 such that it does not (and cannot fit) in the keyhole. The rod member is depressed as the key is inserted into the keyhole and consequently, rod member 410 is urged into the key module and lead 416, which is linked or otherwise connected to the rod member, is displaced, away from contact surface 418. Consequently, no current can pass from lead 416 to contact surface 418, preventing the alarm from activating.

However, when the rod member is urged forward by the spring, the key-removed switch is closed allowing current to pass therethrough. This ON state is shown in FIG. 4B. In particular, FIG. 4B shows spring 412 urging lead member 416 against contact 418. A current may then pass through the key-removed switch and the alarm may be activated.

The rod member 410 may be a non-conductive material in a rod-like shape. However, the member 410 may take other shapes and it may be made of another type of material so long as an electrical connection between lead 416 and contact 418 is prevented when the switch is not intended to be activated.

The key module also includes an alarm 420. In one variation the alarm device is adapted to make a sound. The alarm may also be selected to provide a vibratory, optical, electrical, or other output as desired. A battery 430 is connected to the circuit to provide voltage to the alarm. The battery is preferably a small, long life battery. It may also be removable and rechargeable.

Figure 5:
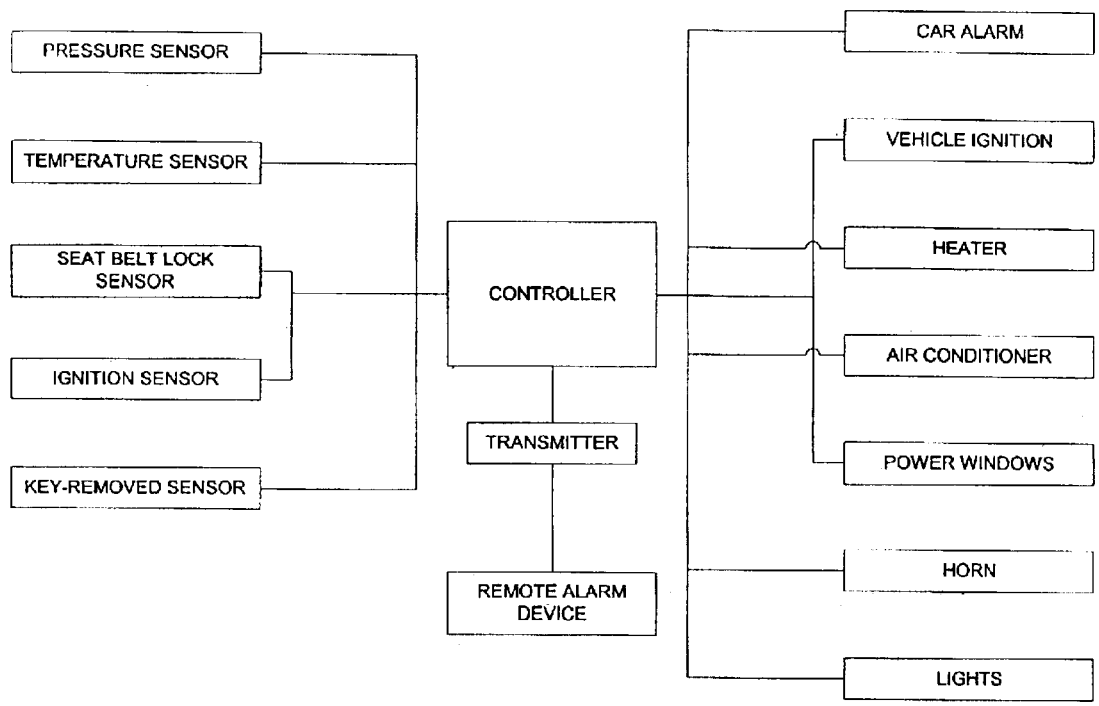
FIG. 5 is a block-diagram illustrating a control unit coupled to various components.

FIG. 5 depicts another variation of the present invention including a controller. This controller may be contained in the vehicle. The controller may be connected to a plurality of devices, components or sensors. For example, various inputs may be provided to the controller including signals from pressure sensors, temperature sensors, seat belt lock sensor, ignition state, key-removed sensor, optical sensors, proximity sensors, etc. The controller may also include (or be coupled to) a receiver to receive information transmitted from a remote location.

Based on input signals sent to the controller, the controller can be configured or programmed to activate a car alarm, vehicle ignition, heater, air conditioner, power windows, horn, lights, brakes, transmitter, cell phone, pager, or another device that may be useful in alerting a parent or protecting a child contained in the car. The controller and components may be powered by the car's battery or, if the car is running, the alternator, or generator.

Although the invention has been described in some detail by way of illustration and example, it will be readily apparent to those of ordinary skill in the art in light of the teachings of this invention that certain changes and modifications may be made thereto without departing from the spirit or scope of the invention. The foregoing description is not intended to limit the invention to only that described. The invention is intended to be limited to only that of the appended claims and any equivalents thereto.

All publications, patent applications, patents, and other references mentioned above are incorporated by reference in their entirety. To the extent there is a conflict in a meaning of a term, or otherwise, the present application will control.

What is claimed is:

1. A seat belt alarm system comprising:
   a seat belt buckle comprising a seat belt-buckled sensor and a transmitter coupled to said seat belt-buckled sensor, said seat belt buckle adapted to transmit a belt-buckled signal from the transmitter when the seat belt is buckled; and
   a key module, said key module remote to said belt buckle and comprising a receiver for receiving the belt-buckled signal, said key module further comprising a voltage source, an alarm device, and a key-removed sensor, said key-removed sensor being coupled to said receiver, voltage source, and alarm device such that when a key is not in a keyhole and said belt-buckled signal is received by said receiver, said alarm device is activated.

2. The seat belt alarm system of claim 1 wherein said key-removed sensor is a mechanical switch.

3. The seat belt alarm system of claim 2 wherein said mechanical switch comprises a mechanically biased rod member that is displaced when the key is inserted into the keyhole.

4. The seat belt alarm system of claim 1 wherein said key-removed sensor is an electronic switch that detects when the key is not in a keyhole.

5. The seat belt alarm system of claim 1 wherein said alarm device is adapted to make a sound.

6. The seat belt alarm system of claim 1 further comprising at least one indicator light that indicates when the seat belt buckle is locked.

7. The seat belt alarm system of claim 1 wherein the buckle includes a passageway for receiving a tongue-shaped belt member.

8. The seat belt alarm system of claim 1 wherein said seat belt buckle sensor is an electronic switch that is turned on when the buckle is buckled.

9. The seat belt alarm system of claim 1 comprising a controller coupled to said seat belt-buckled sensor, said controller activating the transmitter when said seat belt is buckled.

10. The seat belt alarm system of claim 1 wherein the key module further comprises a controller coupled to said key-removed sensor, said alarm device, and said receiver, said controller being configured to activate the alarm device in response to signals received from said key-removed sensor and said receiver.

11. An automobile comprising:
   a seat;
   a seat belt buckle having a seat-belt sensor therein, said seat-belt sensor generating a seat belt-buckled signal when the seat belt is buckled;
   a key-removed sensor that generates a key-removed signal when a key is not in a keyhole;
   a transmitter for sending an alarm-activate signal to a remote device; and
   a controller coupled to the seat-belt sensor, the key-removed sensor, and the transmitter, said controller configured to activate the transmitter in response to the key-removed signal and the belt-buckled signal.

12. The automobile of claim 11 further comprising a horn coupled to said controller, said controller activating said horn in response to said key-removed signal and the belt-buckled signal.

13. The automobile of claim 11 further comprising a temperature sensor coupled to said controller.

14. The automobile of claim 11 wherein the transmitter is configured to send the alarm-activate signal to one of a pager, cell phone, and a keyless entry device.

15. The automobile of claim 11 wherein the transmitter is configured to send the alarm-activate signal to a remote key module, said key module containing a receiver and an alarm device.

16. An infant car seat system comprising:
   an infant car seat, said infant car seat being adapted to be removably secured in a passenger car seat;
   an infant seat belt connected to the infant car seat to hold the infant in the infant car seat;
   a seat belt buckle and a seat belt-buckled sensor within said seat belt buckle, said seat belt buckle attached to said seat belt;
   a transmitter coupled to said seat belt-buckled sensor, said transmitter generating a belt-buckled signal when the seat belt is buckled; and
   a remote key module comprising an alarm device, a key-removed sensor that senses when the key is not in a keyhole and provides a key-removed signal, and a receiver for receiving said belt-buckled signal from said transmitter, said alarm device coupled to said key-removed sensor and said receiver such that said alarm device is activated in response to said belt-buckled signal and said key-removed signal.

17. The infant car seat system of claim 16 further comprising an infant car seat base, said base being securable in the passenger seat and being detachably interlockable with said infant car seat.

18. The infant car seat system of claim 16 wherein the belt-buckled sensor is an electronic switch that completes a circuit when the belt is buckled.

19. A car seat belt alarm system comprising:
   a child presence sensor and a transmitter coupled to said child presence sensor such that when a child is present in the car seat a child-present signal is transmitted from the transmitter; and
   a key module, said key module remote to said child presence sensor and comprising a receiver for receiving the child-present signal, said key module further comprising a voltage source, an alarm device, and a key-removed sensor, said key-removed sensor being coupled to said receiver, voltage source, and alarm device such that when a key is not in a keyhole and said child-present signal is received by said, receiver, said alarm device is activated.

20. The car seat belt alarm system of claim 19 wherein said child presence sensor is a load cell.

21. The car seat belt alarm system of claim 19 wherein said child presence sensor is a belt-buckled sensor.

22. The car seat belt alarm system of claim 19 wherein said key module is adapted to be attached to a key.

23. The car seat car seat belt alarm system of claim 19 wherein said key module is integral with a key.

* * * * *